United States Patent [19]
Takata et al.

[11] Patent Number: 4,760,529
[45] Date of Patent: Jul. 26, 1988

[54] SMOOTH STOP CONTROL SYSTEM

[75] Inventors: Koji Takata; Masato Yoshino, both of Itami, Japan

[73] Assignee: Sumitomo Electric Industries, Ltd., Osaka, Japan

[21] Appl. No.: 62,419

[22] Filed: Jun. 16, 1987

Related U.S. Application Data

[63] Continuation of Ser. No. 652,632, Sep. 20, 1984, abandoned.

[30] Foreign Application Priority Data

Sep. 21, 1983 [JP] Japan ................................. 58-175754

[51] Int. Cl.⁴ ............................................. B60T 8/28
[52] U.S. Cl. ........................................ 364/426; 303/93
[58] Field of Search ............... 364/426, 566; 303/93, 303/94, 97, 105, 108

[56] References Cited

U.S. PATENT DOCUMENTS

| | | | |
|---|---|---|---|
| 3,473,850 | 10/1969 | Lawrie | 303/99 |
| 3,519,805 | 7/1970 | Thorne-Booth | 364/426 |
| 3,829,167 | 8/1974 | Rouf et al. | 303/93 |
| 3,920,278 | 11/1975 | Hirzel et al. | 303/93 |
| 4,094,555 | 6/1978 | Byrne et al. | 303/97 |
| 4,180,223 | 12/1979 | Amberg | 303/93 |
| 4,327,414 | 4/1982 | Klein | 364/426 |
| 4,530,059 | 7/1985 | Brearley et al. | 364/426 |
| 4,552,413 | 11/1985 | Fujii et al. | 364/426 |

Primary Examiner—Gary Chin
Attorney, Agent, or Firm—Wenderoth, Lind & Ponack

[57] ABSTRACT

A smooth stop control system for effecting the smooth stop of an object effected by a brake arrangement includes a detector for detecting an actual speed of the object, a calculator for calculating an actual deceleration of the object and also for calculating a degree of deceleration which changes continuously until the complete stop of said object. It further includes a control which compares the actual deceleration with the calculated deceleration, and controls the brake arrangement in accordance with the result of the comparison so as to render the actual deceleration substantially equal to the calculated deceleration.

15 Claims, 6 Drawing Sheets

SMOOTH STOP CONTROL SYSTEM

This application is a continuation of application Ser. No. 652,632, filed Sept. 20, 1984 now abandoned.

BACKGROUND OF THE INVENTION

1. Field of the Invention

The present invention relates to a system for automatically controlling the deceleration of a moving object in such a manner as to gently stop the object and, more particularly, to a smooth stop control system. The system of the present invention is applicable to any type of machines or devices which must be stopped in a smooth manner, and particularly suitable for use in a machine, such as an automobile, which is designed to carry people and can decelerate more than 3 meters/second$^2$.

Throughout the specification, the term deceleration is used to represent a negative of a differentiated value (a) of a speed (v) of an object with respect to the time (t), as given below:

$$deceleration = -a = -dv/dt.$$

2. Description of the Prior Art

According to the prior art, the deceleration control is dependent mostly on a manual operation. For example, a skilled driver controls the degree of deceleration such that the deceleration is relatively high while the speed of the object is still high and becomes low as the speed is reduced, i.e., at the end of a stop.

There are some control systems which automatically control the deceleration until the speed of the object is reduced to a certain low speed, but for the further deceleration, it is controlled manually. Accordingly, this type of control system cannot be called a full automatic deceleration control system.

Some other control systems may automatically control the deceleration until the object completely stops. But generally in this case, the level of deceleration is relatively low and no serious problem arises. In some systems aimed to have a higher deceleration, it is so controlled as to decelerate the object until the speed of the object is reduced to some slow speed, and thereafter, the deceleration is reduced to a very low level. But if the deceleration starts from a fairly high level, there will be an undesirable shock when the deceleration is switched to said low level.

SUMMARY OF THE INVENTION

The present invention has been developed with a view to substantially solving the above described disadvantages and has for its essential object to provide an improved system for automatically controlling the deceleration of a moving object in such a manner as to gently stop the object within a distance as short as possible.

According to the present invention, a smooth stop control system for effecting the smooth stop of an object comprises, means for detecting an actual speed and deceleration of the object, means for calculating a degree of target deceleration which changes continuously until the complete stop of the object, means for comparing the actual deceleration with the calculated target deceleration, and means for controlling the brake arrangement so as to render the actual deceleration substantially equal to the calculated target deceleration.

BRIEF DESCRIPTION OF THE DRAWINGS

These and other objects and features of the present invention will become apparent from the following description taken in conjunction with preferred embodiments thereof with reference to the accompanying drawings, throughout which like parts are designated by like reference numerals, and in which.

DESCRIPTION OF THE PREFERRED EMBODIMENT

1. Deceleration Lines

Figure 1:
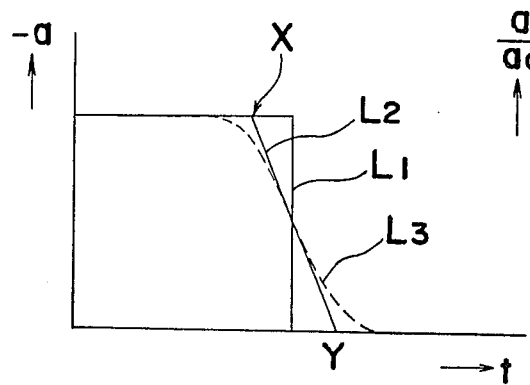
FIG. 1 is a graph wherein abscissa and ordinate represent time and deceleration, respectively.

Referring to FIG. 1, line L1 shows a case wherein an object is decelerated at a constant level until the object stops completely. In this case, when the object stops, a person or a thing carried in the object receives a shock, because the deceleration suddenly changes from some amount to zero. Such a shock will become great and uncomfortable when the constant level of deceleration is greater than 0.05G, wherein G represents acceleration of gravity.

Line L2 shows a case wherein a differentiated value of the deceleration, i.e., da/dt is constant and, therefore, the deceleration does not change suddenly but changes continuously. However, the person or thing in the object receives a shock at points X and Y where the line L2 is bent, that is, where the differentiated value of the deceleration, i.e., da/dt suddenly changes. Generally, the person in the object will learn the constant change of deceleration, i.e., da/dt and, therefore, he or she will be ready for such a change. However, if the rate of change of deceleration, i.e., da/dt changes suddenly at points X and Y, the person will receive a shock before he can make himself ready for such a sudden change of da/dt. Accordingly, he will receive an uncomfortable shock.

Line L3 shows a case wherein the deceleration changes gradually along a cosine curve or a similar curve thereto. When the object is decelerated in accordance with line L3, there will be no sudden change of da/dt. Thus, the object can be gently stopped without giving any uncomfortable shock to the person or thing in the object.

After a number of tests, the present inventors found that the deceleration control according to line L3 provides the least shock to the person and/or thing in the object. In fact, a highly skilled driver controls the automobile along a line similar to line L3 so as to stop the automobile very gently. Therefore, the deceleration control system according to the present invention is so programmed as to control the deceleration of an object in accordance with line L3.

2. Means for Realizing the Smooth Stop Control

As apparent from the above, if a moving object is controlled to decelerate in accordance with line L3, the moving object can be stopped gently. Such a control is referred to as a smooth stop control.

In order to realize a smooth stop control, according to the present invention, there are provided:

(a) a brake device to provide a braking effect in different levels to the object in accordance with a brake signal applied thereto from an external controller;

(b) a detector for detecting the speed and deceleration of the object; and (c) a calculator for calculating a degree of target deceleration which changes continuously until the complete stop of the object; and (d) a controller for controlling the brake device so as to render the actual deceleration substantially equal to the calculated target deceleration upon comparison between the actual deceleration with the calculated target deceleration.

whereby da/dt of the object is changed continuously without any sudden change, such as bent indicated at points X and Y, at the start of the smooth stop control and also during the smooth stop control until the complete stop of the object.

3. Detection of When to Start the Smooth Stop Control

One of the simplest method to detect when to start the smooth stop control is to compare the actual speed of the object with a predetermined speed, and when the actual speed is reduced to the predetermined speed, the smooth stop control may be started.

Figure 2:
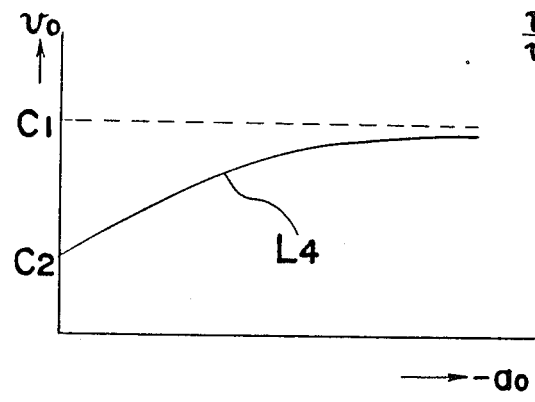
FIG. 2 is a graph wherein abscissa and ordinate represent deceleration and speed, respectively.

However, it is preferable to start the smooth stop control from the relatively high speed when the deceleration is high, and the relatively low speed when the deceleration is low. For example, according to a preferred embodiment, the smooth stop control is started when the actual speed is reduced to a speed shown by a line L4 in FIG. 2. Curve L4 can be expressed as:

$$v_o = (C_1 a_o + C_2 K)/(a_o + K)$$

wherein $(v_o)$ is a speed for entering the smooth stop control, $(a_o)$ is a deceleration for entering the smooth stop control, and $(C_1)$, $(C_2)$ and $(K)$ are constants. $(C_2)$ can be equal to zero.

Instead of providing the above given equation, a relationship between the speed $(v_o)$ and deceleration $(a_o)$ can be given by a table storing various combinations of $(v_o)$ and $(a_o)$. In this case, the relationship therebetween need not be the same as line L4 shown in FIG. 2.

4. Control After the Atart of the Smooth Stop Control

Figure 3:
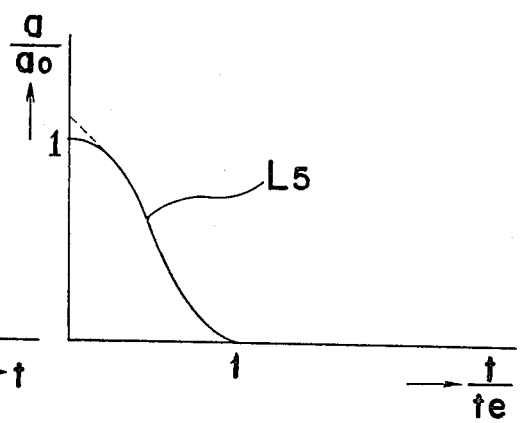
FIG. 3 is a graph wherein abscissa and ordinate represent normalized time and normalized deceleration, respectively.

When the smooth stop control starts, the deceleration changes along a cosine curve, such as curve L5 shown in FIG. 3. The curve L5 can be given by an equation as follows:

$$a = \frac{a_o}{2}\left(1 + \cos\frac{\pi t}{t_e}\right)$$

wherein (a) is an actual deceleration, $(a_o)$ is a deceleration for entering the smooth stop control, (t) is a time, and $(t_e)$ is a required time period from the start of the smooth stop control to the complete stop of the object.

Instead of the equation given above, the relationship between the deceleration (a) and time (t) can be given by a table which is stored with various combinations of (a) and (t). In this case, the relationship therebetween need not be the same as line L5 shown in FIG. 3. As understood from the graph of FIG. 3, it is preferable that the abscissa represents $(t/t_e)$, instead of (t), and ordinate represents $(a/a_o)$, instead of (a), thereby providing dimensionless (no unit) abscissa and ordinate.

When the above relationship, such as line L5, is employed, the error may be undesirably accumulated, resulting in the error of control, such that the object may be stopped before or after the time $(t_e)$. In order to eliminate such an error, the object can preferably be controlled by a curve L7, shown in FIG. 5. Curve L7 is obtained in the following manner. Curve L5, which is in relation to the deceleration, is integrated to obtain a curve L6, which is in relation to the speed. Then, by using curves L5 and L6, curve L7 is obtained. Curve L7 can be expressed by a certain formula:

$$a/a_o = f(v/v_o)$$

or by a table having various combinations of $(a/a_o)$ and $(v/v_0)$. Either as a formula or a table, curve L7 is stored in a memory device.

When curve L7 or a similar relationship is employed, the deceleration is controlled such that the actual speed (v) is detected at a regular interval, and the actual deceleration is controlled to be equal to the calculated result of a target deceleration as follows:

$$a = a_o f(v/v_o).$$

5. Control Immediately Before the Start of the Smooth Stop Control

If the object has been controlled in a so-called constant deceleration system immediately before the start of the smooth stop control, the smooth stop control can be started without any problem. However, if the object has been controlled under a system based on a certain formula dependent on the manipulated amount or manipulated strength by a driver, the deceleration (a) at the time when the speed is $(v_o)$ may possibly be such that:

$$da/dt \neq 0.$$

In such a case, the deceleration curve will be bent to provide an angle at the starting moment of the smooth stop control, resulting in an uncomfortable shock. To eliminate such a shock at the start of the smooth stop control, the actual da/dt should be compared, at a predetermined time interval, with a calculated da/dt according to the smooth stop control formula such as $a=a_0 f(v/v_o)$, after the start of the smooth stop control. The smooth stop control is carried out only when the actual da/dt falls within a predetermined range determined by the calculated da/dt.

To facilitate the comparison, the following analysis should be made.

Figure 6:
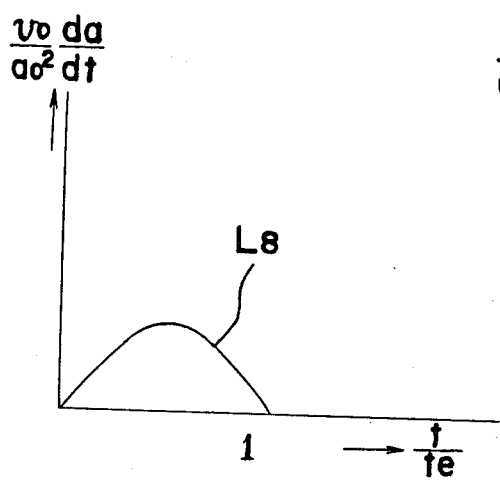
FIG. 6 is a graph wherein abscissa and ordinate represent normalized time and rate of change of deceleration with respect to time expressed with the use of initial speed and initial deceleration, respectively.

First, curve L5 of FIG. 3 is differentiated to obtain curve L8 of FIG. 6. In this case, the abscissa should preferably represent $$\frac{v_o}{a_o^2} \frac{da}{dt}$$

instead of da/dt, so that the abscissa is made dimensionless.

Figure 4:
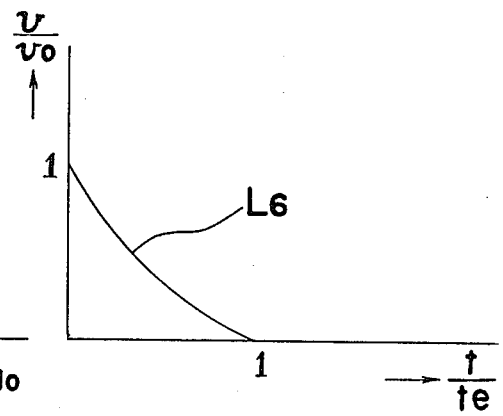
FIG. 4 is a graph wherein abscissa and ordinate represent normalized time and normalized speed, respectively.

Next, by the use of curves L5 (FIG. 3), L6 (FIG. 4) and L8 (FIG. 6), curve L9 is obtained through the following calculation:

$$\frac{v}{v_o} \times \frac{a_o^2}{a^2} \times \frac{v_o}{a_o^2} \frac{da}{dt}$$

which is substantially equal to $$\frac{v}{a^2} \frac{da}{dt},$$

Figure 7:
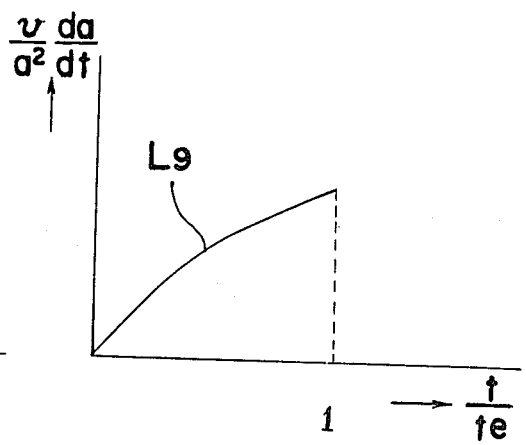
FIG. 7 is a graph wherein abscissa and ordinate represent normalized time and rate of change of deceleration with respect to time expressed with the use of present speed and initial deceleration, respectively.

Accordingly, the result of calculation $$\frac{v}{a^2} \frac{da}{dt}$$

using the parameters (v), (a) and (da/dt) detected while the object is being controlled and following curve L5, will fall along line L9 shown in FIG. 7. According to a preferred embodiment, the abscissa should preferably represent $v/v_o$ rather than $t/t_e$ and, for this purpose, curve L10 (FIG. 8) is obtained using curves L6 (FIG. 4) and L9 (FIG. 7). Curve L10 can be expressed by a certain formula:

$$\frac{v}{a^2} \frac{da}{dt} = g(v/v_o)$$

or by a table having various combinations of $$\left( \frac{v}{a^2} \frac{da}{dt} \right)$$

and $(v/v_o)$. Either as a formula or a table, curve L10 is stored in a memory device.

6. Process for Starting Smooth Stop Control

Before starting the smooth stop control, the speed (v) and deceleration (a) of the object is regularly detected at a predetermined time interval. The smooth stop control will be started if two requirements are satisfied.

The first requirement to start the smooth stop control is related to the speed of the object. If the detected result (a, v) is plotted above curve L4, that is, if the detected speed (v) is greater than $(v_o)$ with respect to the detected deceleration $(a_o)$, it is not permitted to enter the smooth stop control. On the other hand, if the detected result is plotted on or below curve L4, that is, if the detected speed (v) is equal to or less than $(v_o)$ for the detected deceleration $(a_o)$, the first requirement is met. The values $v_o$ and $a_o$ obtained when the first requirement is met are stored. The smooth stop control, however, is still suppressed until the second requirement is met.

The second requirement is related to the deceleration of the object. By the use of the detected and stored value $v_o$, a value $g(v/v_o)$ is calculated. Also, a value $$\frac{v}{a^2} \frac{da}{dt}$$

is calculated. If the calculated value $$\frac{v}{a^2} \frac{da}{dt}$$

falls above curve L10, that is, if the calculated value $$\frac{v}{a^2} \frac{da}{dt}$$

is greater than $g(v/v_o)$, it is not permitted to release the suppression and, therefore, the smooth stop control is not yet actually carried out. On the other hand, if the calculated value $$\frac{v}{a^2} \frac{da}{dt}$$

is plotted on or below curve L10, that is, if the calculated value $$\frac{v}{a^2} \frac{da}{dt}$$

is equal to or less than $g(v/v_o)$, the smooth stop control is started.

The smooth stop control can be carried out in two different procedures, as described below.

Figure 5:
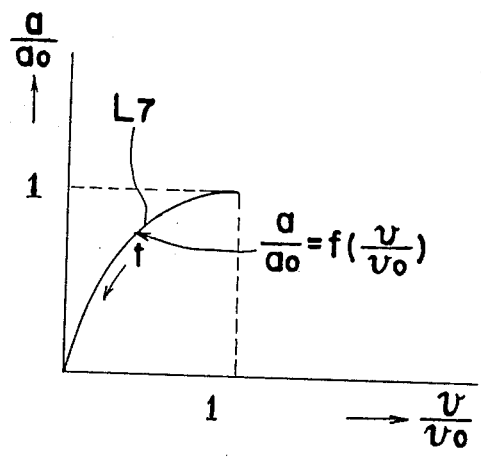
FIG. 5 is a graph wherein abscissa and ordinate represent normalized speed and normalized deceleration, respectively.

The first procedure for the smooth stop control is carried out in accordance with line L7 shown in FIG. 5. In this case, in order to reduce or eliminate any error in the deceleration $(a_o)$, the deceleration $(a_o)$ is found on line L7 through an inverse operation:

$$a_o = \frac{a^*}{f\left(\frac{v^*}{v_o}\right)}$$

using values (a*) and (v*) which represent the actual (a) and (v), respectively, at the beginning of carrying out of, i.e., releasing the suppression of, the smooth stop control. Thereupon, the object is under the smooth stop control such that its deceleration (a) follows line L7 upon calculation of:

$$a=a_o \times f(v/v_o)$$

using the obtained deceleration $(a_o)$ and speed $(v_o)$.

Figure 8:
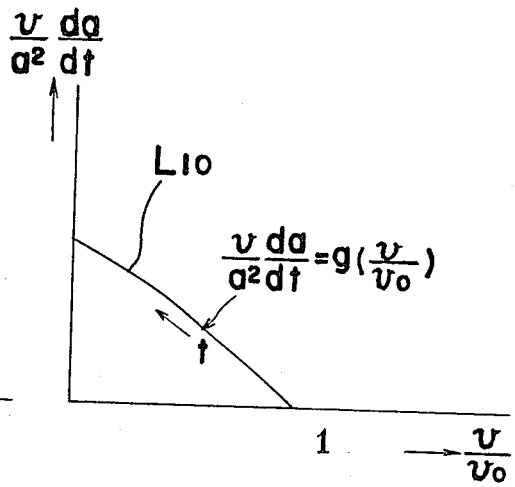
FIG. 8 is a graph wherein abscissa and ordinate represent normalized speed and rate of change of deceleration with respect to time expressed with the use of present speed and initial deceleration, respectively.

Another procedure for the smooth stop control is carried out in accordance with line L10 shown in FIG. 8. According to this procedure, the target deceleration (a) at the very near future (after a time period $\Delta t$) is calculated using the present data in accordance with the following formula:

$$a_{t+\Delta t} = a_t + \frac{a_t^2}{v_t} \times g\left(\frac{v_t}{v_o}\right) \times \Delta t$$

wherein ($a_t$) and ($v_t$) represent deceleration and speed at a certain time (t), respectively, ($a_{t+\Delta t}$) represents target deceleration at a time (t+$\Delta$t), and ($\Delta$t) represents a very short period of time. According to this procedure, it is necessary to store only one formula g, instead of two formulas f and g. Therefore, it is possible to arrange the system with a small storing means.

In the formula g, if da/dt=0 at $v=v_o$, we obtain g(1)=0. Also, since da/dt=0 at v=0, we obtain g(0)>$\frac{1}{2}$. Furthermore, if the deceleration (a) can be given by:

$$a = \frac{a_o}{2}\left(1 + \cos\frac{\pi t}{t_e}\right)$$

we obtain g(0)$\frac{2}{3}$.

From the above, the formula g can be expressed, for example, as follows:

$$g\left(\frac{v}{v_o}\right) = K\left(1 - \frac{v}{v_o}\right)^n$$

wherein K>$\frac{1}{2}$, and (n) being a constant.

7. Termination of Smooth Stop Control before the Complete Stop

In some occasions, such as when the intention to stop the object lasts no longer, or at an emergency when it is necessary to suddenly stop the object within a very short distance even with the shock, it is necessary to terminate the smooth stop control before the complete stop of the object.

In the case where the control before the smooth stop control is a programmed control (one of the simplest example of the programmed control is the constant deceleration control), the order for the termination of the smooth stop control needed at the above occasions will be automatically given to the programmed control system and, therefore, the termination can be accomplished without any problem.

On the contrary, in the case where the control before the smooth stop control is a deceleration control based on a certain formula dependent on the manipulated amount or manipulated strength by a driver, it is necessary to further detect the intended amount of deceleration of the object even after the start of the smooth stop control. Based on the detected result, it is further detected whether or not the intention to stop the object lasts no longer, or whether or not it is necessary to suddenly stop the object. For this purpose, the following procedure is taken.

In the case where the detected result of the driver's intention indicates that he does not require to stop the object, that is when the target deceleration required by the driver is less than the target deceleration obtained in accordance with the smooth stop control, it is understood that the driver does not have, any longer, the intention to stop the object, or that the driver is suspending his intention to stop the object. (In the above sentence, the comparison between the target decelerations is carried out by taking absolute values thereof. It is understood to those skilled in the art that in the description herein, the term of, or the symbol for, the absolute value is omitted for the sake of brevity.) In such a case, the smooth stop control terminates, and the control is carried out in accordance with the driver's intended control.

On the other hand, when the detected result of the driver's intention indicates that the driver's intention is to immediately stop the object, that is when the absolute value of the deceleration required by the driver is greater than the absolute value of the deceleration obtained at the beginning of the releasing point of the smooth stop control, it is understood that the case is in emergency. therefore, the smooth stop control terminates, and the object stops immediately in accordance with the driver's intended control. Here, the absolute value of the deceleration obtained at the suppression releasing point or the beginning point of the smooth stop control means an absolute value of (a*) when the equation:

$$\frac{v}{a^2} \frac{da}{dt} = g\left(\frac{v}{v_o}\right)$$

is satisfied at first time. This value of a is designated as (a*).

If the above control for the termination is employed without any improvement, the smooth stop control can be terminated when the driver's intended control of the deceleration is much higher than the target deceleration in accordance with the smooth stop control, resulting in an unexpected large increase of deceleration at the moment of the termination of the smooth stop control. To this end, an improvement is made.

Figure 9:
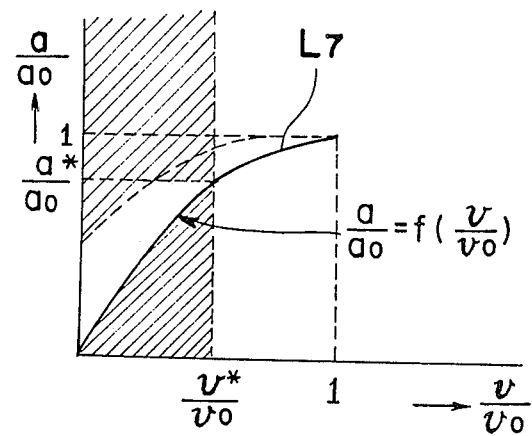
FIG. 9 is a graph wherein abscissa and ordinate represent normalized speed and normalized deceleration, respectively, and particularly showing a range for interrupting the smooth stop control.

Referring to FIG. 9, line L7, which is the same line as that of FIG. 5 is shown. Furthermore, at upper left corner thereof, a hatched section enclosed by a dotted curve is shown, which is spaced from line L7. When it is assumed that the suppression is released at a point, or the smooth stop control begins from a point, (v*/$v_o$, a*/$a_o$), the smooth stop control will be continued until the speed (v) is reduced to 0. According to the improvement, the smooth stop control will not be terminated unless the driver's control deviates from line L7 and enters into the hatched section. The line defining the hatched section can be given by a suitable formula or by a suitable table stored in a memory means.

8. Application of Smooth Stop Control System of the Present Invention

Figure 10:
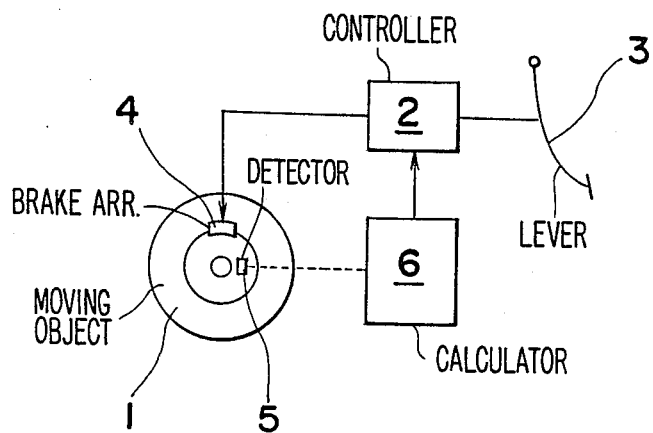
FIG. 10 is a block diagram showing an arrangement of a system for automatically controlling the deceleration, according to one embodiment.

Referring to FIG. 10, a block diagram of a brake system is shown. A moving object 1 is diagrammatically shown by a circle. Provided to the moving object 1 are brake arrangement 4 and a detector 5 for detecting the speed of the moving object 1. The brake arrangement 4 is connected to a controller 2 for controlling the degree of braking effect by the brake arrangement 4. Controller 2 is coupled to a calculator 6 and also to a lever 3 which can be operated manually. In the calculator 6, the actual deceleration (a) of the object 1 is calculated by differentiating the detected speed (v). Instead, the actual deceleration (a) can be detected directly by a deceleration detector (not shown) provided to the object 1. Furthermore, the change of deceleration da/dt is also calculated in the calculator 6. The details of the elements in FIG. 10 have been omitted for the sake of brevity. However, such details are known to one skilled in the art and are discussed in detail in U.S. Pat. No. 4,327,414 to Kline. Accordingly, such additional disclosure is incorporated by reference herein.

Figure 11:
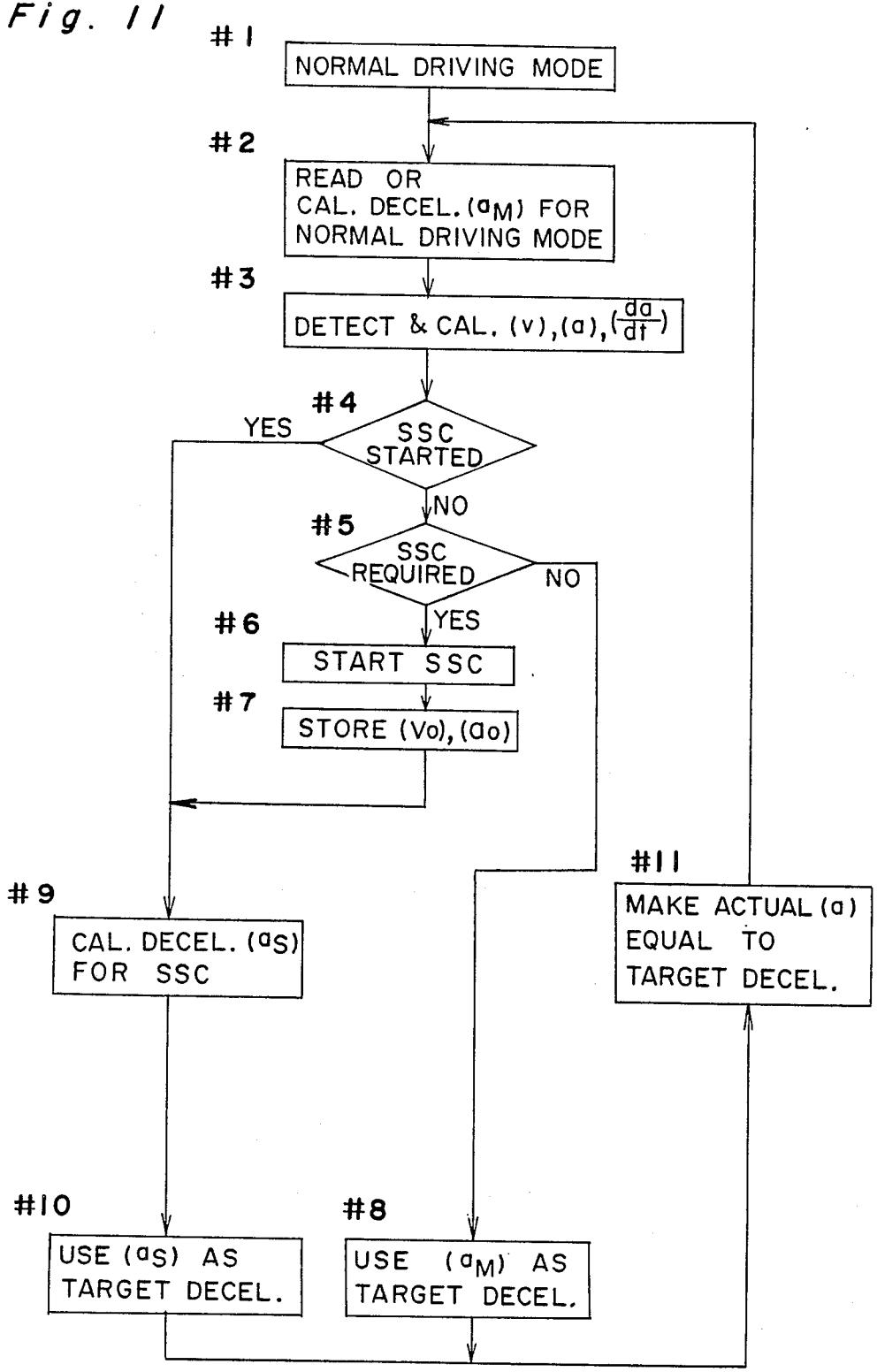
FIGS. 11, 12 and 13 are flow chart showing the steps for automatically controlling the deceleration according to the present invention under different modes of operations.
Figure 12:
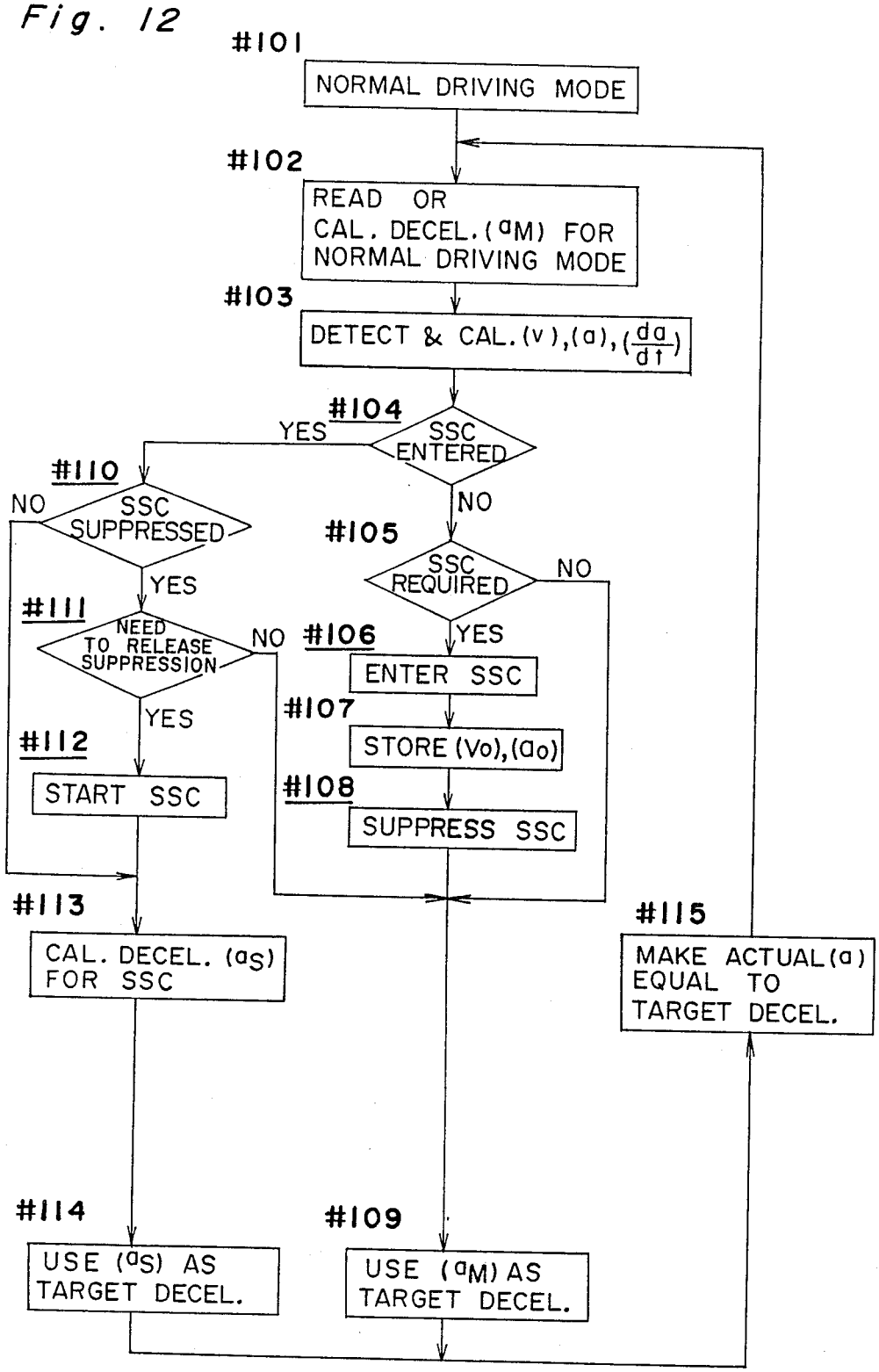
Figure 13:
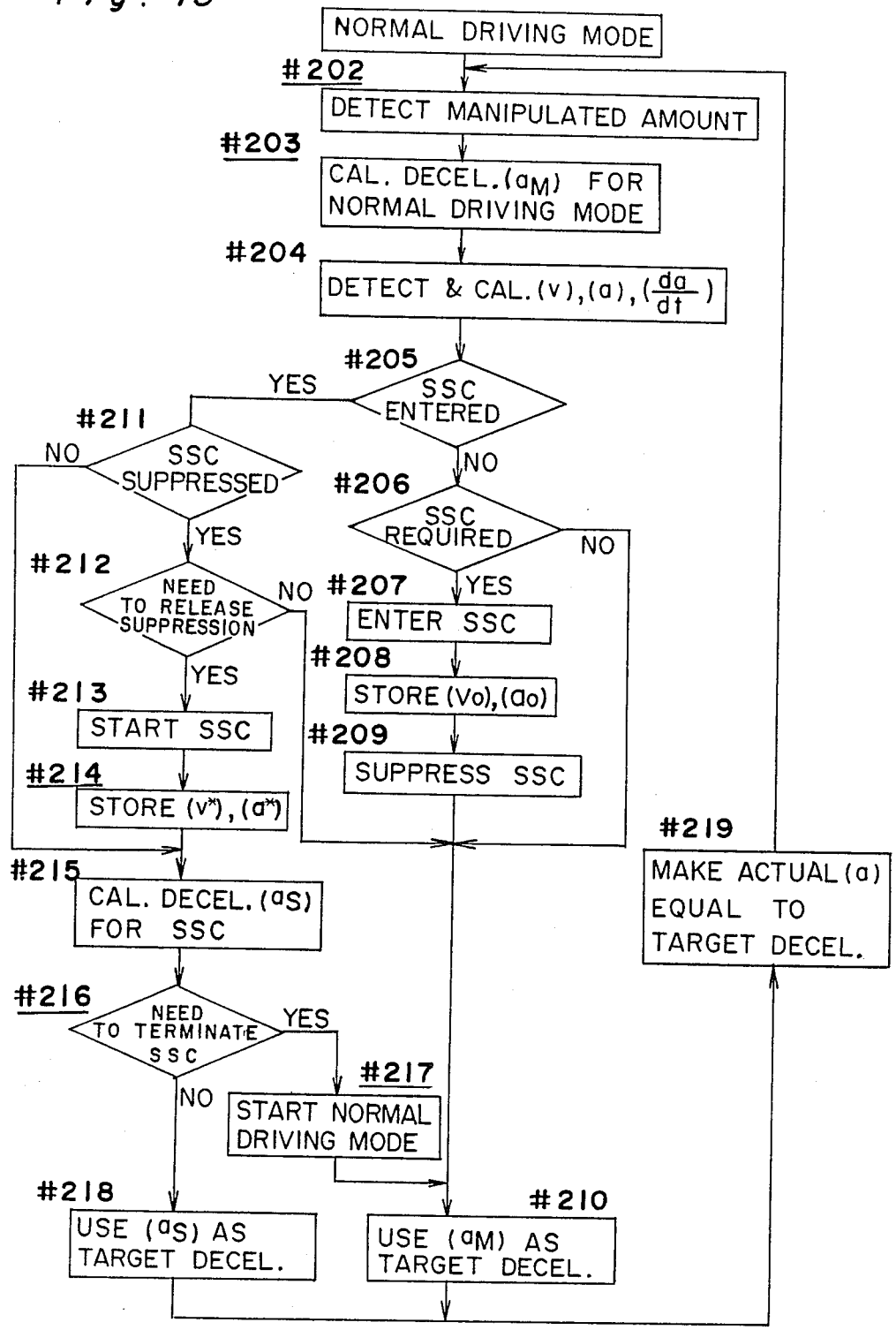

Referring to FIGS. 11, 12 and 13, three different flow charts are shown for the three different types of control systems. In the flow charts and the description hereinbelow, the abbreviation SSC represents the term smooth stop control.

Referring to FIG. 11, a flow chart for effecting the SSC under the first type of control system is shown. The first type of the control system has a feature such that the deceleration (a) before the SSC, is controlled to be constant, for example, by a programmed schedule. Accordingly, when a line representing the deceleration under the first type control system and a line, such as line L5 in FIG. 3, representing the smooth stop curve are considered, these two lines can be connected without any bent. In other words, these two lines have the same gradient ($da/dt=0$) at the connecting point therebetween. Next, the steps are described in detail.

At step #1, an object is under the normal driving mode, which is in this case the first type control system. At step #2, the deceleration ($a_M$) for the normal driving mode is obtained through a calculation or reading from a program of the normal driving mode. Then, at step #3, the actual (v), (a) and (da/dt) at present are detected or calculated. At step #4, a check is made whether the SSC is already started or not. In the first cycle of the operation through the flow chart of FIG. 11, it is understood that the SSC is not yet started. Accordingly, in the first cycle, the program goes to step #5 at which a decision is made whether the SSC is required or not. This decision is done by a comparison between the actual speed (v) and a certain speed ($v_o$) at a certain deceleration ($a_o$) given by line L4 shown in FIG. 2. If the actual speed (v) is reduced equal to or below the certain speed ($v_o$), the SSC is required and, therefore, the program goes to step #6 so as to start the SSC. If not, the program goes to step #8 at which the obtained deceleration ($a_M$), which is based on the program for the normal driving mode, is picked as a target deceleration. Then at step #11, the actual deceleration (a) is controlled and made substantially equal to the target deceleration, which is in this case ($a_M$). Then, the program returns to step #2.

When the SSC starts at step #6, the speed ($v_o$) and deceleration ($a_o$) obtained at the starting moment of the SSC is stored at step #7. Then, the deceleration ($a_S$) for the SSC is obtained through the calculation at step #9. The deceleration ($a_S$) can be obtained in two different ways which are already explained in the above under the item 6 with a subtitle "Process for Starting Smooth Stop Control". Then, at step #10, the obtained deceleration ($a_S$) is picked and used as a target deceleration. Then at step #11, the actual deceleration (a) is controlled and made substantially equal to the target deceleration, which is in this case ($a_S$). Then, the program returns to step #2.

Once the SSC is started at step #6, the program procedure in the succeeding cycles follows the steps of #2, #3, #4, #9 and #10 so as to control the deceleration (a) in a manner shown by curve L5 of FIG. 3.

As understood from the foregoing, under this control system, the SSC starts without any delay after the SSC is required.

Referring to FIG. 12, a flow chart for effecting the SSC under the second type of control system is shown. The second type of the control system has a feature such that the rate of change of the deceleration da/dt before the SSC, is controlled to be variant. Accordingly, under this control system, even when the SSC is required, sometimes the SSC starts not immediately after the requirement, but with some delay. The case when the delay takes place is when the rate of change of the deceleration da/dt before the SSC is not zero, such as indicated by a dotted line in FIG. 3 representing the programmed deceleration ($a_M$) under the normal driving mode. In such a case, even when the SSC is required, the SSC is temporarily suppressed until the gradient of the dotted line in FIG. 3, i.e,. $da_M/dt$ coincides with the gradient of the smooth stop curve, such as L5. Accordingly, during the suppression, the object is controlled under the normal drive mode using the deceleration $a_M$ as the target deceleration. When these two gradients coincides with each other, the suppression is released, and immediately thereafter, the SSC starts. Next, the flow chart of the SSC under the second type of the control system is described in detail in connection with FIG. 12 in which the step numbers with an underline are the steps which are different from the flow chart of FIG. 11.

In the same manner described above, the deceleration ($a_M$) is obtained (#102), and the actual (v), (a) and (da/dt) at present are detected or calculated (#103). Then, at step #104, a check is made whether or not the SSC is entered or not. Here, the term "enter" covers toth "required and started" and "required but not yet started". In the first cycle, the SSC is not entered and, therefore, the program goes to the next step #105 to decide whether or not the SSC is required. If the SSC is required, the program goes to step #106 at which the SSC is entered. At this point, the SSC is not yet started, but the preparation for the SSC, such as to store ($v_o$), ($a_o$) as carried out in the next step #107, starts. Immediately thereafter, the SSC is suppressed at step #108, whereby the actual start of the SSC is delayed. As understood from the further steps #109 and #115, the object is still under the control of the normal driving mode, using ($a_M$) as the target deceleration.

If step #106 has been passed in the previous cycle, the program goes from step #104 to step #110 in the next cycle of the procedure. At step #110, a check is made whether the SSC is suppressed or not. If yes, the program goes to step #111 at which a decision is made whether it is necessary to release the suppression or not. This decision is done by the comparison between the above-mentioned two gradients. If the two gradients are different from each other, the program follows steps #109 and #115, thereby further delaying the actual start of the SSC. On the other hand, when the two gradients coincide with each other, the program goes to step #112 to actually start the SSC. Then, the deceleration ($a_S$) for the SSC is obtained through the calculation at step #113, and at step #114, the obtained deceleration ($a_S$) is picked and used as a target deceleration. Then at step #115, the actual deceleration (a) is controlled and made substantially equal to the target deceleration, which is in this case ($a_S$). Then, the program returns to step #102.

Thereafter, the procedure through steps #102, #103, #104, #110, #113, #114 and #115 is repeated, thereby controlling the object to make a smooth stop in accordance with a programmed deceleration, such as shown by line L5.

Referring to FIG. 13, a flow chart for effecting the SSC under the third type of control system is shown. The third type of the control system has a feature such that the target deceleration is calculated according to the manual operation, such as by a brake pedal (not shown). Accordingly, during the normal driving mode, the deceleration is dependent on the driver's will, but once the SSC is started, the object decelerates according to the program, such as along line L5. In the case where the driver wishes, during the SSC, to stop the object more quickly or not to stop the object, the SSC is immediately terminated and the object is brought under the control of manual operation in the normal driving mode. Next, the flow chart of the SSC under the third type of the control system is described in connection with FIG. 13 in which the step numbers with an underline are the steps which are different from the flow chart of FIG. 12.

At step #202, a manipulated amount is detected. For example, if the deceleration is manually controlled by a brake pedal, the degree of depression of the brake pedal is detected. Then, at step #203, using the detected manipulated amount, the deceleration ($a_M$) for the normal driving mode is calculated. The SSC enters, the start of the SSC is temporarily suppressed in the same manner as described above. Then, after step #213 at which the SSC is started, the speed (v*) and deceleration (a*) are stored. As understood from the foregoing description, (v*) and (a*) represent, respectively, the speed and deceleration at the start of the SSC, for example, those obtained at a point where the dotted line in FIG. 3 touching line L5. Then, after step #215, a decision is made whether or not it is necessary to terminate the SSC. This decision is done by the detection whether the deceleration amount obtained by the manual operation falls within the shaded portions shown in FIG. 9, or not. If it does not fall within the shaded portion, the program goes to step #218 to continue the SSC. On the contrary, if it falls within the shaded portion, the program goes to step #217 to immediately terminate the SSC and to start again the deceleration control based on the normal driving mode, which in this case is dependent on the manual operation.

Although the present invention has been fully described with reference to a preferred embodiment, many modifications and variations thereof will now be apparent to those skilled in the art, and the scope of the present invention is therefore to be limited not by the details of the preferred embodiment described above, but only by the terms of appended claims.

What is claimed is:

1. A smooth stop control system for effecting the smooth stop of an object having a controllable brake arrangement comprising:
   a means for detecting an actual deceleration of said object;
   a means for producing a normal control target deceleration;
   a means for comparing said actual deceleration with said normal control target deceleration to produce a difference between said actual deceleration and said normal control target deceleration; and
   a means for controlling said brake arrangement so as to minimize said difference and thereby making said actual deceleration substantially equal to said normal control target deceleration, further comprising:
   a means for producing a smooth stop control target deceleration which overrides said normal control target deceleration at the near end of a stop and comparing said smooth stop control target deceleration with said actual deceleration to produce said difference to control said brake arrangement, said smooth stop control target deceleration a being such that it is calculated according to the equation:

$$a = a_o \times f(v/v_o)$$

wherein $a_o$ and $v_o$ are deceleration and speed, respectively, at the entering of the smooth stop control, v is the actual speed of the object, and $f(v/v_o)$ is a function with a variant $v/v_o$.

2. A method for carrying out a smooth stop control of an object having a controllable brake arrangement comprising the steps of:
   detecting an actual deceleration of said object;
   producing a normal control target deceleration;
   comparing said actual deceleration with said normal control target deceleration to produce a difference between said actual deceleration and said normal control target deceleration; and
   controlling said brake arrangement so as to minimize said difference thereby making said actual deceleration substantially equal to said normal control target deceleration, characterized further comprising the step of:
   producing a smooth stop control target deceleration which overrides said normal control target deceleration at the near end of a stop and comparing said smooth stop control target deceleration with said actual deceleration to produce said difference to control said brake arrangement, said smooth stop control target deceleration a being calculated according to the equation:

$$a = a_o \times f(v/v_o)$$

wherein $a_o$ and $v_o$ are deceleration and speed, respectively, at the entering of the smooth stop control, v is the actual speed of the object, and $f(v/v_o)$ is a function with a variant $v/v_o$.

3. A method for carrying out a smooth stop control as claimed in claim 2, further comprising the step of:
   detecting an actual speed of said object; and
   comparing the said actual speed with a predetermined speed, whereby said smooth stop control target deceleration producing step overrides said normal control target deceleration when said actual speed is reduced down to said predetermined speed.

4. A method for carrying out a smooth stop control as claimed in claim 3, wherein said predetermined speed is constant regardless of the deceleration of said object.

5. A method for carrying out a smooth stop control as claimed in claim 3, wherein said predetermined speed increases with respect to the increase of the deceleration of said object.

6. A method for carrying out a smooth stop control as claimed in claim 2, wherein said smooth stop control target deceleration changes sinusoidally with respect to time.

7. A method for carrying out a smooth stop control as claimed in claim 2, wherein values of $(v/v_o)$ and the corresponding values of $f(v/v_o)$ are stored in a table.

8. A method for carrying out a smooth stop control as claimed in claim 2, further comprising the steps of:
   detecting an actual speed of said object; and
   comparing said actual speed with a predetermined speed, whereby when said actual speed is reduced down to said predetermined speed, said smooth stop control step includes storing the values $a_o$ and $v_o$, which represent deceleration and speed, respectively, at the start of the smooth stop control step, but suppressing the actual initiation of the smooth stop control step;

calculating $$\frac{v}{a^2} \frac{da}{dt}$$

in which v is the actual speed of the object, and a is the smooth stop control target deceleration;
calculating $g(v/v_o)$ which is a function with a variant $v/v_o$; and
comparing $$\frac{v}{a^2} \frac{da}{dt}$$

with $g(v/v_o)$, whereby said controlling step initiates the smooth stop control step when $$\frac{v}{a^2} \frac{da}{dt}$$

becomes equal to or smaller than $g(v/v_o)$.

9. A method for carrying out a smooth stop control as claimed in claim 8, wherein various combinations of $(v/v_o)$ and corresponding $g(v/v_o)$ are stored in a table.

10. A method for carrying out a smooth stop control as claimed in claim 8, wherein said function g is given as follows:

$$g\left(\frac{v}{v_o}\right) = K\left(1 - \frac{v}{v_o}\right)^n$$

wherein $K > \frac{1}{2}$, and (n) being a constant.

11. A method for carrying out a smooth stop control as claimed in claim 2, wherein said smooth stop control target deceleration (a) is calculated by a formula II given by an equation:

$$a_{t+\Delta t} = a_t + \frac{a_t^2}{v_t} \times g\left(\frac{v_t}{v_o}\right) \times \Delta t \qquad \text{II}$$

wherein $(a_t)$ and $(v_t)$ represent actual deceleration and speed at a certain time (t), respectively, $(a_{t+\Delta t})$ represents smooth stop control target deceleration at a time $(t+\Delta t)$, and $(\Delta t)$ represents a very short period of time.

12. A method for carrying out a smooth stop control as claimed in claim 2, wherein, before the normal control overridden by said smooth stop control, said normal control is such that the target deceleration is the deceleration intended by the operator of the object and corresponds to the operating effort of the operator upon an operating means including a brake pedal.

13. A method for carrying out a smooth stop control as claimed in claim 12, further comprising the steps of:
detecting an absolute value of an intended deceleration $(a_M)$ according to the degree of depression of a brake pedal during the smooth stop control;
detecting an absolute value of the smooth stop control target deceleration $(a_S)$ during the smooth stop control;
comparing the two detected absolute values; and
terminating the smooth stop control when said absolute value of the intended deceleration $(a_M)$ falls down less than said absolute value of the smooth stop control target deceleration $(a_S)$, whereupon the smooth stop control is terminated.

14. A method for carrying out a smooth stop control as claimed in claim 12, further comprising the steps of:
detecting an absolute value of an intended deceleration $(a_M)$ according to the degree of depression of a brake pedal during the smooth stop control;
detecting an absolute value of an initial smooth stop control target deceleration $(a^*)$ at which the smooth stop control actually starts;
comparing the two detected absolute values; and
terminating the smooth stop control when said absolute value of the intended deceleration $(a_M)$ exceeds said absolute value of the initial smooth stop control target deceleration $(a^*)$, whereupon the smooth stop control is terminated.

15. A method for carrying out a smooth stop control as claimed in claim 12, further comprising the steps of:
detecting an absolute value of an intended deceleration $(a_M)$ according to the degree of depression of a brake pedal during the smooth stop control;
detecting an absolute value of a predetermined threshold deceleration which is greater than the absolute value of the smooth stop control target deceleration $(a_S)$ during the smooth stop control;
comparing the two detected absolute values; and
terminating the smooth stop control when said absolute value of the intended deceleration $(a_M)$ exceeds the predetermined threshold value which is greater than said absolute value of the smooth stop control target deceleration $(a_S)$, whereupon the smooth stop control is terminated.

* * * * *